(12) United States Patent
Gauf et al.

(10) Patent No.: US 8,826,084 B1
(45) Date of Patent: Sep. 2, 2014

(54) METHOD AND SYSTEM FOR IMPLEMENTING AUTOMATED TEST AND RETEST PROCEDURES

(75) Inventors: Bernie Gauf, Vienna, VA (US); Scott Bindas, Rochester, MA (US); Shawn Kline, Washington, DC (US); Matthew Oehler, Lumberton, NJ (US); Dave Ponticello, Medford, NJ (US)

(73) Assignee: Innovative Defense Technologies, LLC, Arlington, VA (US)

( * ) Notice: Subject to any disclaimer, the term of this patent is extended or adjusted under 35 U.S.C. 154(b) by 168 days.

(21) Appl. No.: 13/605,182

(22) Filed: Sep. 6, 2012

Related U.S. Application Data

(60) Provisional application No. 61/531,769, filed on Sep. 7, 2011.

(51) Int. Cl.
*G06F 11/00* (2006.01)

(52) U.S. Cl.
USPC ............................................. 714/46; 714/32

(58) Field of Classification Search
USPC ...................... 714/32, 33, 45, 46; 717/125
See application file for complete search history.

(56) References Cited

U.S. PATENT DOCUMENTS

| | | | |
|---|---|---|---|
| 5,678,002 A | 10/1997 | Fawcett et al. | |
| 5,781,720 A | 7/1998 | Parker et al. | |
| 7,055,137 B2 * | 5/2006 | Mathews | 717/125 |
| 7,548,979 B2 | 6/2009 | Hanners et al. | |
| 7,890,806 B2 * | 2/2011 | Kwong et al. | 717/124 |
| 7,934,200 B2 * | 4/2011 | Liu | 717/124 |
| 8,117,591 B1 * | 2/2012 | Michelsen | 717/109 |
| 8,392,886 B2 * | 3/2013 | Sweis et al. | 717/125 |
| 8,522,083 B1 * | 8/2013 | Cohen et al. | 714/38.1 |
| 8,578,336 B1 * | 11/2013 | Wiradarma et al. | 717/125 |
| 2003/0031992 A1 | 2/2003 | Laferriere et al. | |
| 2004/0160438 A1 | 8/2004 | Shih et al. | |
| 2006/0095949 A1 | 5/2006 | Whish-Wilson et al. | |
| 2007/0220341 A1 * | 9/2007 | Apostoloiu et al. | 714/33 |
| 2008/0126880 A1 * | 5/2008 | Hegarty et al. | 714/46 |
| 2008/0127095 A1 * | 5/2008 | Brennan et al. | 717/124 |
| 2009/0235122 A1 | 9/2009 | Rovang et al. | |
| 2009/0249121 A1 * | 10/2009 | Kube et al. | 714/32 |
| 2010/0077260 A1 * | 3/2010 | Pillai et al. | 714/46 |
| 2010/0180260 A1 * | 7/2010 | Chikkadevaiah et al. | 717/125 |
| 2010/0251031 A1 * | 9/2010 | Nieh et al. | 714/45 |
| 2011/0239214 A1 * | 9/2011 | Frields et al. | 718/1 |
| 2012/0151448 A1 * | 6/2012 | Becker et al. | 717/125 |

OTHER PUBLICATIONS

Memon, A.M. (2001). A Comprehensive Framework for Testing Graphical User Interfaces, See pp. 16, 18, 116, 117.
Takahashi, J. (Nov. 2002). Effective automated testing: a solution of graphical object verification. Test Symposium,(ATS '02). Proceedings of the 11th Asian , pp. 284-291.
Ivory, M. Y. (2001). State of The Art in Automating Usability Evaluation of User Interfaces, ACM Computing Surveys.

\* cited by examiner

*Primary Examiner* — Marc Duncan
(74) *Attorney, Agent, or Firm* — Hunton & Williams LLP

(57) ABSTRACT

According to an embodiment of the present invention, a computer implemented method and system for automated test and retesting using an interactive interface provided by a computer processor comprising: a test case builder, comprising at least one processor, configured to automatically generate code for a test case; a test flow tool, comprising at least one processor, configured to generate a plurality of test flows for the test case; an execution engine, comprising at least one processor, configured to automatically execute the plurality of test flows on a system under test; and an output interface configured to receive output data from the system under test.

20 Claims, 16 Drawing Sheets

METHOD AND SYSTEM FOR IMPLEMENTING AUTOMATED TEST AND RETEST PROCEDURES

CROSS REFERENCE TO RELATED APPLICATION

This application claims priority to Provisional Application No. 61/531,769 filed on Sep. 7, 2011. The contents of this priority application are incorporated herein by reference in their entirety.

STATEMENT REGARDING FEDERALLY SPONSORED RESEARCH OR DEVELOPMENT

This invention was made with Government support under contract HQ0147-12-C-7840 awarded by U.S. Missile Defense Agency. The Government has certain rights in the invention.

FIELD OF THE INVENTION

The present invention relates generally to automated test and retest procedures and more specifically to model-driven automated software testing.

BACKGROUND OF THE INVENTION

Commercial and military systems today are largely software based and growing in complexity. However, despite advances in development practices and tools, the goals of accelerating the rate at which systems can be delivered and reducing their costs cannot be met by simply writing software faster. Delivering faster, cheaper, and higher quality software will only be met with comparable improvements in the practices and tools for automated testing and analysis. Current systems require constant supervision of testing software by trained individuals. Oftentimes, the testing procedures are time-consuming and burdensome. For example, one change for a certain discrete function may affect many other functions of a system, and thereby requiring testing of not just the discrete function but of all the other functions. Thus, considerably time and effort are needed by trained individuals to properly test complex software systems.

Other drawbacks may also be present.

SUMMARY OF THE INVENTION

Accordingly, one aspect of an embodiment of the present invention is to address one or more of the drawbacks set forth above. According to an exemplary embodiment, a method and system for automated test and retesting using an interactive interface provided by a computer processor comprises: a test case builder, comprising at least one processor, configured to automatically generate code for a test case; a test flow tool, comprising at least one processor, configured to generate a plurality of test flows for the test case; an execution engine, comprising at least one processor, configured to automatically execute the plurality of test flows on a system under test; and an output interface configured to receive output data from the system under test.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
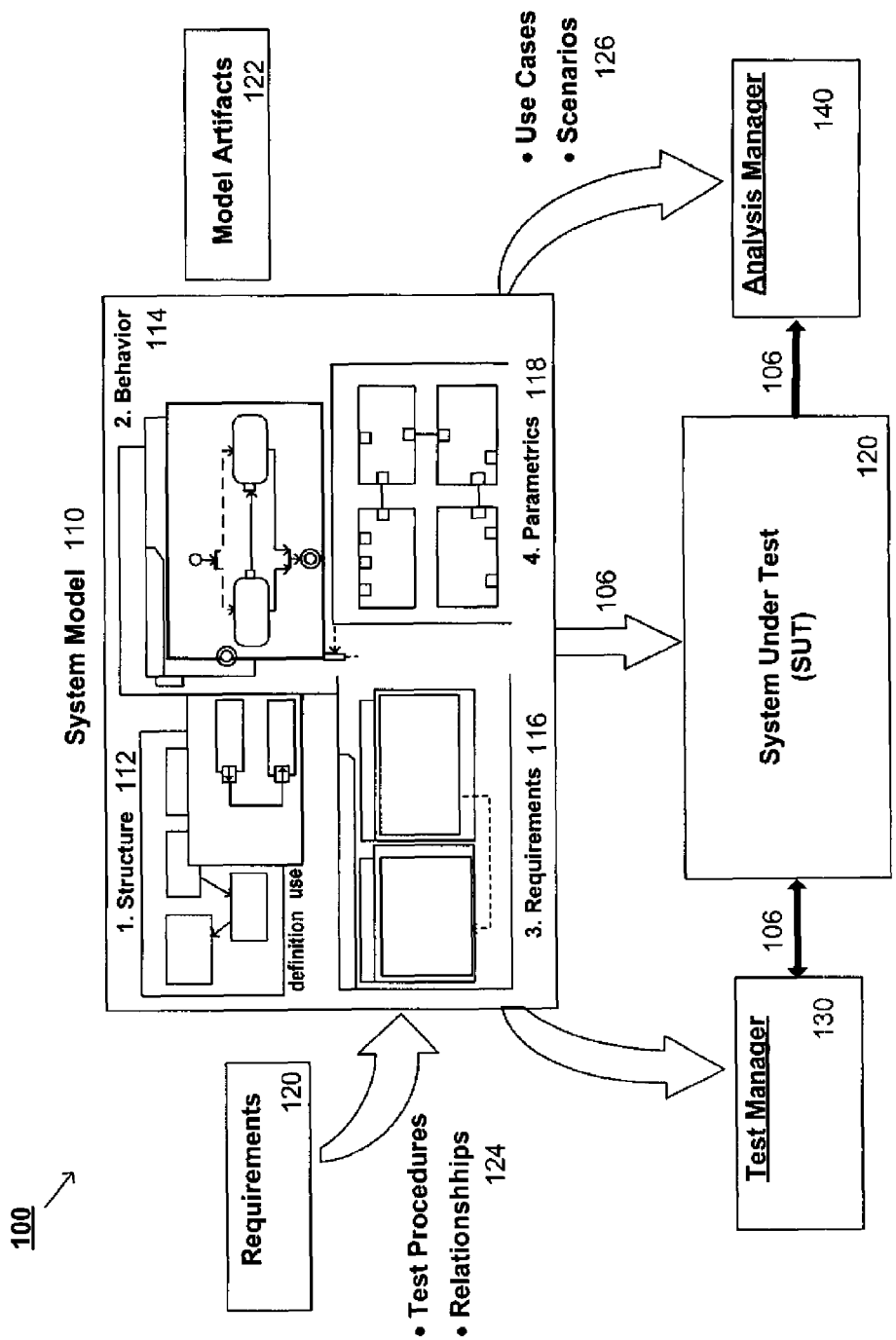
FIG. 1 is an exemplary diagram of a system for model-driven automated software testing, according to an embodiment of the present invention.

An embodiment of the present invention is directed to an Automated Test and Re-Test (ATRT) process and suite of technologies to address automated testing of large complex systems and systems-of-systems. A focus of the ATRT system is directed to reducing time and effort involved in conducting system integration and testing while expanding the depth and breadth of test requirement coverage. As a result, projects demonstrate a substantial reduction in test time while expanding test requirement coverage.

An embodiment of the present invention provides users, such as manual testers, the ability to automate test procedures without having to be software developers themselves. A system of an embodiment of the present invention provides a highly scalable solution that may run 10 or 10000s of tests connecting to any number of displays and servers and further provide automated analysis for 100s of test outcomes or 10000s or more. An embodiment of the present invention can test systems independent of an operating system or a platform and further support various cloud computing and other environments, thereby providing improved customization and configuration. Whether a user needs to write a plug-in to a modeling tool, defect tracking tool or requirements management solution, etc., an embodiment of the present invention may be easily extensible to allow for these additional integration features. Accordingly, any desired tool enhancements and features may be implemented on demand. Moreover, an embodiment of the present invention may be non-intrusive to the System under Test (SUT) in that it reduces or even eliminates modifications to the SUT configuration.

An embodiment of the present invention allows the same or similar test scenarios to run repeatedly with different data sets (e.g., boundary testing, equivalence partitioning, etc.). According to an exemplary application, model driven automated testing allows test flows to be generated via a simple point and click model driven interface solution. An embodiment of the present invention, thus, addresses various complex testing challenges of software systems by providing an innovative technical solution that solves testing problems of complex software systems. For example, testing of a heterogeneous multicomputer environment while providing an integrated solution which includes a tool suite may be achieved and engineering services may be applied across the entire testing lifecycle.

Model-driven automated software testing automates control of a system test via a Test Manager and analysis management of resulting test data via an Analysis Manager. A central System Model manages requirements, use cases and/or other information that encapsulates behaviors of a System Under Test (SUT). An auto-code generator may leverage the System Model and automatically generate code for efficient development of test cases. Once system modeling and metadata are complete, test flows may be created for a Test Manager and analysis flows may be created for an Analysis Manager.

A Test Flow may be a collection of one to many actions arranged to satisfy a specific goal. Test cases, test steps, and functions may each have corresponding Test Flows. Each Test Flow may in turn contain other Test Flows, such as test cases containing test steps, or a test step containing a function. Test Flows may be simple and linear, or may be complex, using conditional constraints or forks and joins to determine behavior.

Test Manager automates large scale system tests through execution of defined Test Flows by providing automated control over system displays and system control messages. The user may execute a predefined Test Flow which comes directly from the System Model, or the user may generate their own Test Flow using a repository of system actions. The Test Manager may then execute the Test Flow on the SUT and report the performance of each step within that flow.

Analysis Manager may perform various functions, such as extract, map, and link the fundamental data for testing from the SUT recorded raw data. Analysis Manager may then assess the data against Analysis Flows generated from the System model. System performance may be analyzed when the SUT data is executed through the verification and requirement steps defined in the Analysis Flows. Analysis Manager may then output a series of integrated reports and plots. An embodiment of the present invention recognizes that with the increase of test coverage comes an increase of test results that needs to be analyzed. Thus, an automated reporting capability on the increased test coverage and outcome, comparing expected versus actual results may be provided.

An embodiment of the present invention may combine Graphical User Interface (GUI) and non-GUI automated testing. GUI and message based testing capability for Systems Under Test (SUTs) may be provided when GUIs are unavailable or when GUI test automation is not beneficial, and Message Based testing is a viable solution. Also, GUI based automated testing may be enhanced with Message Based testing. Messages may include any message in any form that is sent from one device to another device through a network connection. Messages may include text, images, audio, video and/or other form of data, as well as various combinations thereof. Distributed testing over a network may involve automated tests executed over a network. For an exemplary test case, various GUI or message based outputs may be dependent on each other over a network. An example may involve: GUI output 1 is a prerequisite to GUI output 2, or to test other serial or parallel message or GUI based interactions. Concurrent testing support may be provided, for the test case where various test scenarios may run in parallel and race-conditions and other concurrency issues have to be detected, and simulation of live SUT interaction may be required. A batch processing feature may be provided for the case when various test cases may be executed together as a batch job as part of endurance or longevity testing.

An embodiment of the present invention provides scriptless automated testing. For example, software testing code may be automatically generated for the tester through simple point and click features. With a "capture playback" feature, a baseline test code may be generated behind the scenes and may then be re-used for regression testing for each subsequent SUT release. Keyword driven automated testing may reduce test creation time significantly, and may further enable the tester to generate automated test code via simple clicks of test related test "action" icons as part of a test scenario. Code may be generated behind the scene and may be automatically added to the automated test baseline. Also, keyword driven testing allows for conformity of testing scripts across the board and increases maintainability of automated test scripts. Input test data may be grouped into boundaries: e.g., valid, invalid, boundary, one off boundary and so forth. An embodiment of the present invention recognizes that most defects congregate around boundary values of data input. Thus, a manual testing challenge is that there is often not enough time to cover the boundaries or equivalence classes of test data input combinations. With data driven testing feature of an embodiment of the present invention, one test scenario may be reused over and over with different data values and data combinations. The model-driven automated testing capability of an embodiment of the present invention allows complex test flows (e.g., loops, conditionals, etc.) to be designed via a model driven interface via simple point/click/drag, e.g., test creation and execution via a workflow/flowchart user interface.

FIG. 1 is an exemplary diagram of a system for model-driven automated software testing, according to an embodiment of the present invention. A system 100 of an embodiment of the present invention may include a System Model 110. As illustrated in FIG. 1, system 100 may include user communication devices associated with one or more users accessing the System Model 110 of an embodiment of the present invention. The user may establish a communication session with a communication device via a communication network 106.

System Model 110 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication network 106.

A communication network 106 may be coupled to System Model 110 and one or more communication devices (e.g., user communication devices, etc.). SUT 120 may communicate with Test Manager 130 and Analysis Manager 140 via communication network 106. The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System Model 110 may access databases and/or other sources of information in accordance with an embodiment of the present invention. The databases may be further combined and/or separated. The databases may reside at a single location or separated through multiple locations. In addition, the databases may be supported by an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data and information may be stored and cataloged in Databases which may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to System Model, which, in some embodiments, it is accessible through a network, such as communication network, e.g., 106 illustrated in FIG. 1, for example.

As shown in FIG. 1, Model-Driven Automated Software Testing (AST) technology automates scenario control of a system test (via Test Manager 130) as well as analysis management of the resulting test data (via Analysis Manager 140). A central System Model 110 manages the system test flows, requirements, and analysis behavioral threads (e.g., system Use Cases), when combined define a test procedure. An embodiment of the present invention may be directed to an auto-code generator that leverages the model and automatically generates code that may be compiled into the software suite. Auto-generation allows for rapid development of test cases and utilizes a centralized system engineering architecture.

Exemplary features of the model-driven process may include: robust AST process to address any complex system; full AST solution from scenario control to performance reporting; and AST solution generated from centrally managed model. Using this process, with a non-intrusive integration with the SUT, a user may control an entire test of complex systems as well as perform analysis from one tool.

As shown in FIG. 1, System Model 110 may include various modules and components. In this exemplary illustration, System Model 110 may include Structure 112, Behavior 114, Requirements 116 and Parametrics 118. System requirements, shown by 120, may be received by System Model 110. System requirements may include test procedures, relationships and/or descriptive testing metadata. System Model 110 may then manage various systems requirements, system behaviors, and system tests. According to an exemplary implementation, System Model 110 may include a Systems Modeling Language tool or other modeling language tool, or may even include a home-grown model or other customized model. Regardless, standard system engineering modeling practices may be supported, and system requirements may be read in and linked directly within System Model 110.

System Model 110 may define numerous Industry standard artifacts and/or other artifacts, as represented by Model Artifacts 122. Model Artifacts 122 may include use cases, requirements traceability, activity diagrams, sequence diagrams, verification steps, test procedures and/or other information that encapsulate behaviors of the System Under Test (SUT). An embodiment of the present invention may utilize an approach that incorporates descriptive metadata into the model to facilitate auto-code generator.

Once the system modeling and metadata are complete for a project, Test Flows may be created for Test Manager 130, and Analysis Flows may be created for Analysis Manager 140.

According to an embodiment of the present invention, a Test Flow may describe the series of events for controlling and testing the SUT and SUT environment while under test. Analysis Flows may describe detailed verification steps for completing assessment of internal requirements and algorithms of the SUT.

Test Manager 130 may be used to automate large scale system tests through execution of defined Test Flows by providing automated control over system displays and system control messages. Some of the displays and messages drive system simulators or system consoles that may be used for full closed-loop testing. A user may manage a Test Flow within the Test Manager. For example, the user may execute a predefined Test Flow which comes from the System Model, or the user may generate their own Test Flow using a repository of system actions. The Test Manager may then execute the Test Flow on the SUT and report the performance of each step within that flow.

Analysis Manager 140 may automate data analysis, performance assessment, and expand test coverage for lower-level software and algorithm requirements levied within the SUT. Analysis Manager 140 may perform various functions, such as extract, map, and link the fundamental data for testing from the SUT recorded raw data. Typically, raw data sets from multi-day test events may be enormous in size and often contain windows of erroneous data caused by software and hardware failures during test time. Isolating and organizing the data allows for timely evaluation and analysis. Analysis Manager 140 may then assess the data against Analysis Flows generated from the System model. System performance may be analyzed when the SUT data is executed through the verification and requirement steps defined in the Analysis Flows. Also, Analysis Manager 140 may receive use cases, scenarios and/or other data from System Model 110. Analysis Manager 140 may then output a series of integrated reports and plots. These reports may include requirements, pass/fail reports, verification methods for each requirement within the reports, system performance analysis results, and plots which characterize the events.

Test Manager 130 may provide automated control over system displays and system control messages while the system is under test. Some of the displays and messages may drive system simulators or system consoles for full closed-loop testing. Test Manager 130 may record Test Flows and playback back graphically at a later time. This may include capturing and analyzing send/receive messages that drive the SUT and SUT stimulus. The capture and playback functionality may be used when conducting interface testing within a system, or interoperability tests between multiple systems. For example, messages may be recorded and processed through Test Manager 130 during the test to record and analyze the messages before a different subscriber system receives the messages. Messages may include sending and receiving scenario control messages; simulation control messages; heartbeat/health messages, for example.

Figure 2:
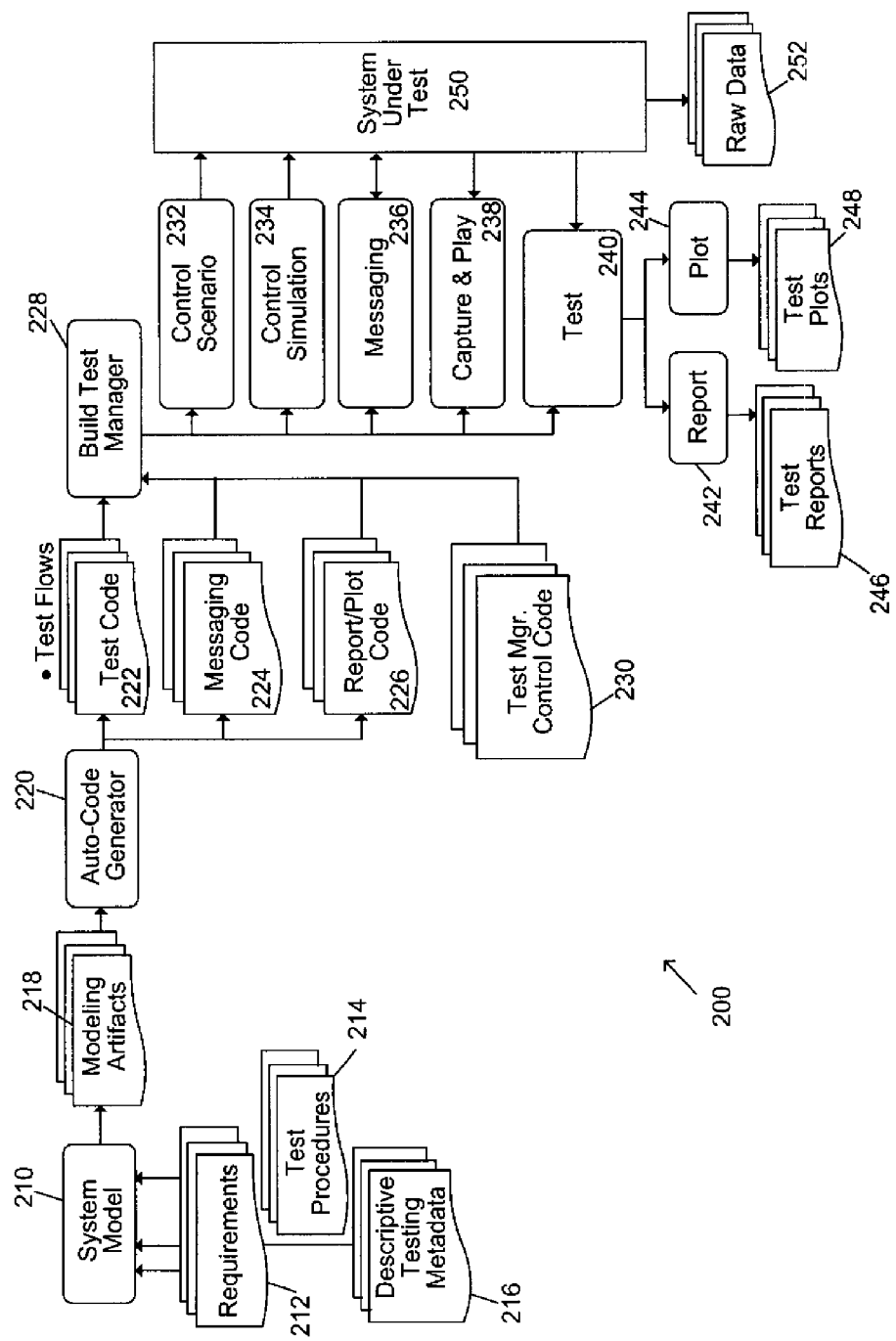
FIG. 2 is an exemplary flowchart for illustrating a model-driven Test Manager process, according to an embodiment of the present invention.

FIG. 2 is an exemplary flowchart for illustrating a model-driven Test Manager process, according to an embodiment of the present invention. This method is provided by way of example, as there are a variety of ways to carry out the methods described herein. Method 200 shown in FIG. 2 may be executed or otherwise performed by one or a combination of various systems. The method 200 may be carried out through system 100 of FIG. 1 by way of example. Each block shown in FIG. 2 represents one or more processes, methods, or subroutines carried out in method 200.

The process may include automatically generating software from modeling artifacts and additional metadata. The code generated from System Model may provide a significant cost, schedule, and technical advantage over existing testing and analysis capabilities. Once a Test Flow is established, Test Manager 130 may execute control commands via the system's pre-existing displays/GUIs and capture and record these actions. The records may be used to playback the test at a later time. From existing simulators (e.g., stimulus injection) and consoles, the SUT may operate and extract raw data which the Analysis Manager may then process.

As shown in FIG. 2, one or more inputs may be received by System Model, as shown by 210. In this example, the inputs may include Requirements 212, Test Procedures 214 and Descriptive Testing Metadata 216. Requirements 212 and Test Procedures 214 may be project specific. Modeling artifacts, as shown by 218, may be generated, which may include use cases, activity diagrams, sequence diagrams, mapped requirements and/or other data. Using this data, auto-code generator may be implemented at step 220. From the auto-code generator, various test flows may be created, such as Test Code 222, Messaging Code 224 and Report/Plot Code 226. The test flows may be project specific. Outputs from the test flows may be used to build Test Manager, at 228. Test Manager control code 230 may be received and used to build Test Manager as well. Test manager control code may include code related to framework, control, data management, capture and play, pass/fail, defect, statistics and/or other data. Test Manager may then manage various functions, such as Control Scenario at 232, Control Simulation at 234, Messaging at 236, Capture and Play at 238 and Test at 240. System Under Test (SUT) is shown at 250 and may output raw data 252. Test 240 may verify requirements, for example. Outputs may include reports 242, such as test reports 246 including summary, pass/fail, event reconciliation, defect reporting and/or other reports. Test Plots 248 may include performance and events reconciliation. Other types of reports and plots may be implemented.

Figure 3:
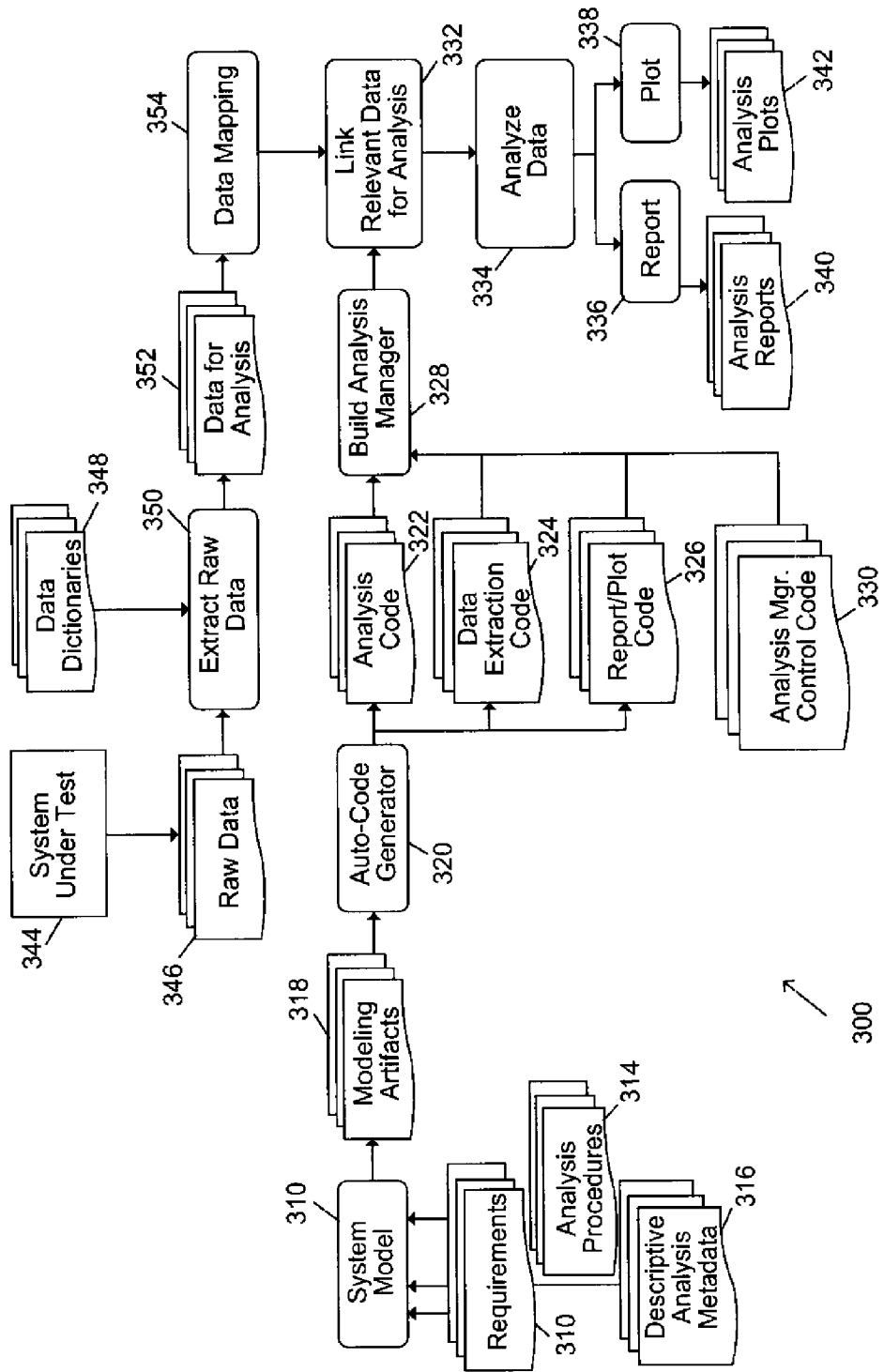
FIG. 3 is a flowchart illustrating an exemplary detailed Analysis Manager process flow, according to an embodiment of the present invention.

FIG. 3 is a flowchart illustrating an exemplary detailed Analysis Manager process flow, according to an embodiment of the present invention. This method is provided by way of example, as there are a variety of ways to carry out the methods described herein. Method 300 shown in FIG. 3 may be executed or otherwise performed by one or a combination of various systems. The method 300 may be carried out through system 100 of FIG. 1 by way of example. Each block shown in FIG. 3 represents one or more processes, methods, or subroutines carried out in method 300.

One or more inputs may be received by System Model, as shown by step 310. In this example, the inputs may include Requirements 312, Analysis Procedures 314 and Descriptive Analysis Metadata 316. Requirements 312 and Analysis Procedures 314 may be project specific. Modeling artifacts, as shown by 318, may be generated, which may include use cases, activity diagrams, sequence diagrams, mapped requirements and/or other data. Using this data, auto-code generator may be implemented at step 320. The process may include automatically generating software from the modeling artifacts and additional metadata. From the auto-code generator, various analysis flows may be created, such as Analysis Code 322, Data Extraction Code 324 and Report/Plot Code 326. Outputs from the analysis flows may be used to build Analysis Manager, at 328. Also, analysis manager control code 330 may be received and used to build Analysis Manager as well. Analysis manager control code may include code related to control, data management, pass/fail, statistics and/or other data. System Under Test (SUT) 344 may generate raw data, as shown by 346. Data Dictionaries, shown at 348, may also provide data at 350. Data Dictionaries may include data and/or instructions to process raw data 346. The collected data may then be analyzed, at 352, in the form of data mapping at 354. Analysis Manager may then link relevant data for analysis at 332. Data analysis may be performed at 334, which may include verifying requirements and performing analysis. The Analysis Manager may work on the SUT's raw data sets produced from an executed Test Flow from the Test Manager. Various forms of output may be generated, such as Report 536 in the form of Analysis Reports 340 and Plots 338 in the form of Analysis Plots 342. Other types of reports and plots may be implemented.

Figure 4:
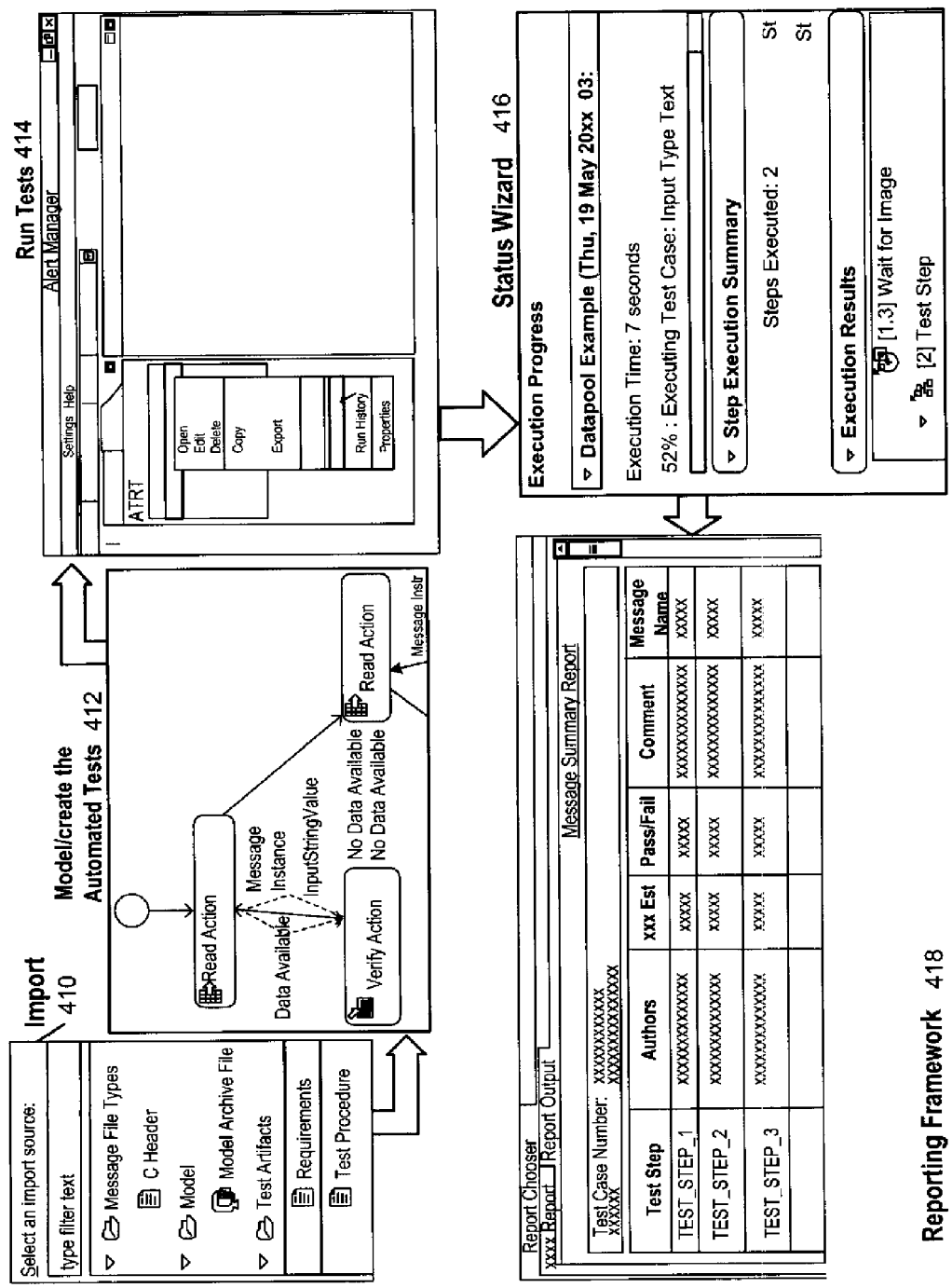
FIG. 4 is an exemplary diagram illustrating an automated test and re-test system, according to an embodiment of the present invention.

FIG. 4 is an exemplary diagram illustrating operation of an ATRT system, according to an embodiment of the present invention. Input data may be selected and imported, as shown by 410, to a System Model to create automated tests, as shown by 412. As shown by 412, test flows may be created by using an interactive user interface. Test flows may be executed on the SUT, as illustrated by 414. A status interface provides details concerning the execution progress, as shown by 416. Analysis data may be then be reported, as shown by Reporting Framework 418.

Figure 5:
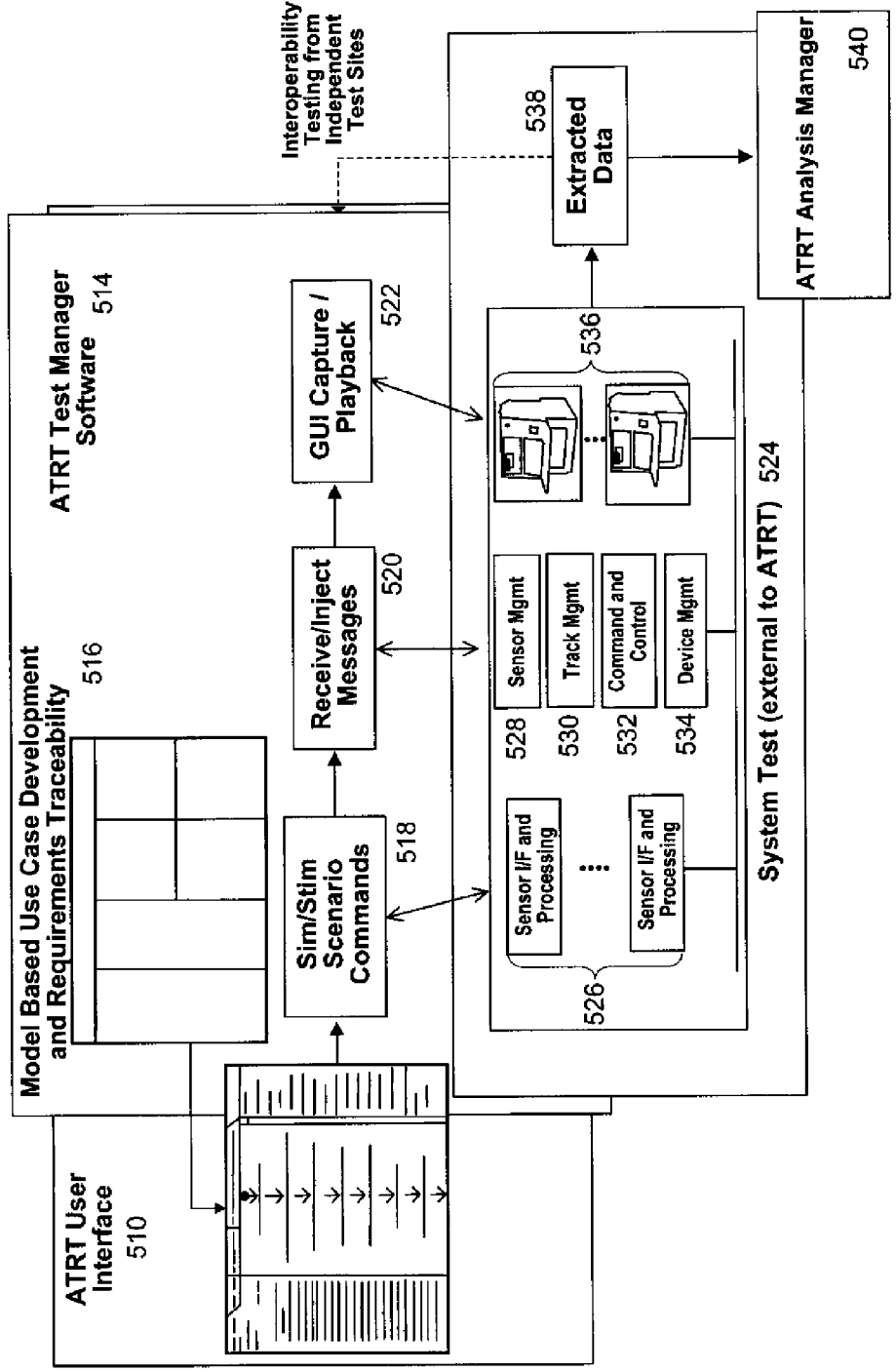
FIG. 5 is an exemplary process diagram for Test Manager, according to an embodiment of the present invention.

FIG. 5 is an exemplary process diagram for Test Manager, according to an embodiment of the present invention. Test Manager Software 514 may communicate to a user, via a User Interface 510. Test Manager Software 514 may provide various management functionality, including use case development and requirements traceability, as shown by 516. To track progress, a Requirements Traceability Matrix® may be provided that allows for traceability of test artifacts back to the requirements. An embodiment of the present invention also provides for automated capture using x, y coordinates. For quick and easy automated test creating and for SUT's whose GUI image positions rarely change, an automated capture feature based on x, y coordinates may be provided. Test Manager Software 514 may also receive scenario commands at 518, receive and inject messages at 520 and perform capture and playback at 522. System Test which may be external to ATRT is shown by 524. In this example, System Test performs processing and management functionality, as shown by sensor and processing modules 526, sensor management module 528, track management module 530, command and control module 532 and devices management module 534. The System Test may also invoke various devices, as illustrated by 536. As the tests are being performed, data may be extracted at 538, which may then be used to perform analysis by Analysis Manager 540. Analysis may include data management, event reconstruction, requirements verification, performance analysis and various types of test reports.

Figure 6:
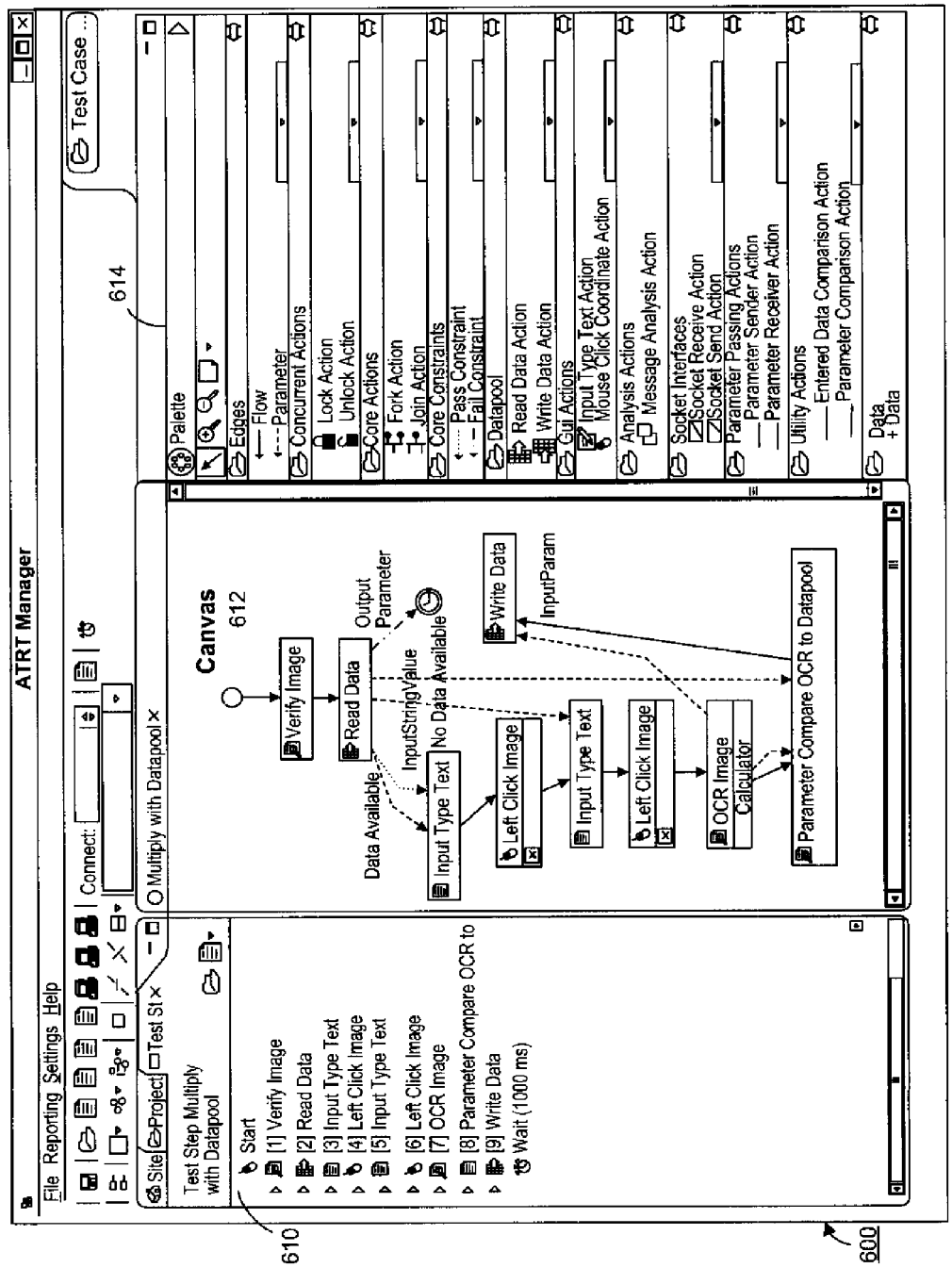
FIG. 6 is an exemplary illustration of a canvas provided by Test Manager, according to an embodiment of the present invention.

FIG. 6 is an exemplary illustration of a canvas provided by Test Manager, according to an embodiment of the present invention. A canvas provides a user interface for building test flows. Interface 600 may include several panels, including Panel 610 which provides test steps, including verify image, read data, input type text, left click image, OCR image, parameter compare, write, data, wait, and other steps. Canvas 612 illustrates test flows, which may include a collection of test steps or actions. Panel 614 provides various actions, including concurrent actions, core actions, core constraints, data pool, GUI actions, analysis actions, socket interfaces, parameter passing actions, utility actions, etc. Also, functions and edges that indicate the order of test execution may be specified.

Figure 7:
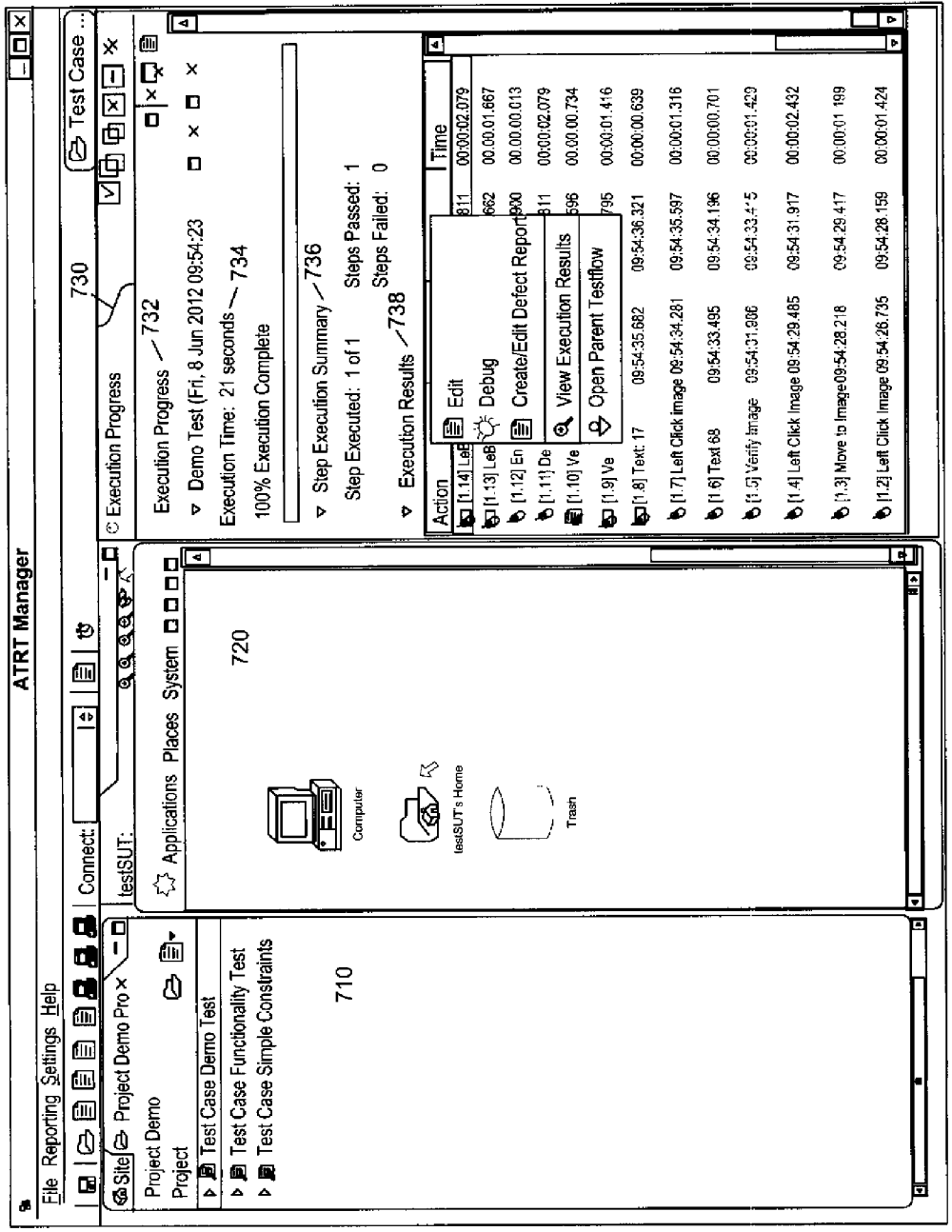
FIG. 7 is an exemplary illustration of a capturing and executing process provided by Test Manager, according to an embodiment of the present invention.

FIG. 7 is an exemplary illustration of a capturing and executing process provided by Test Manager, according to an embodiment of the present invention. Panel 710 provides a list of projects, tests, constraints, etc. Panel 720 represents a System Under Test. Panel 730 illustrates details of execution progress 732. For example, execution time 734, execution summary 736 and execution results 738 may be displayed.

Figure 8:
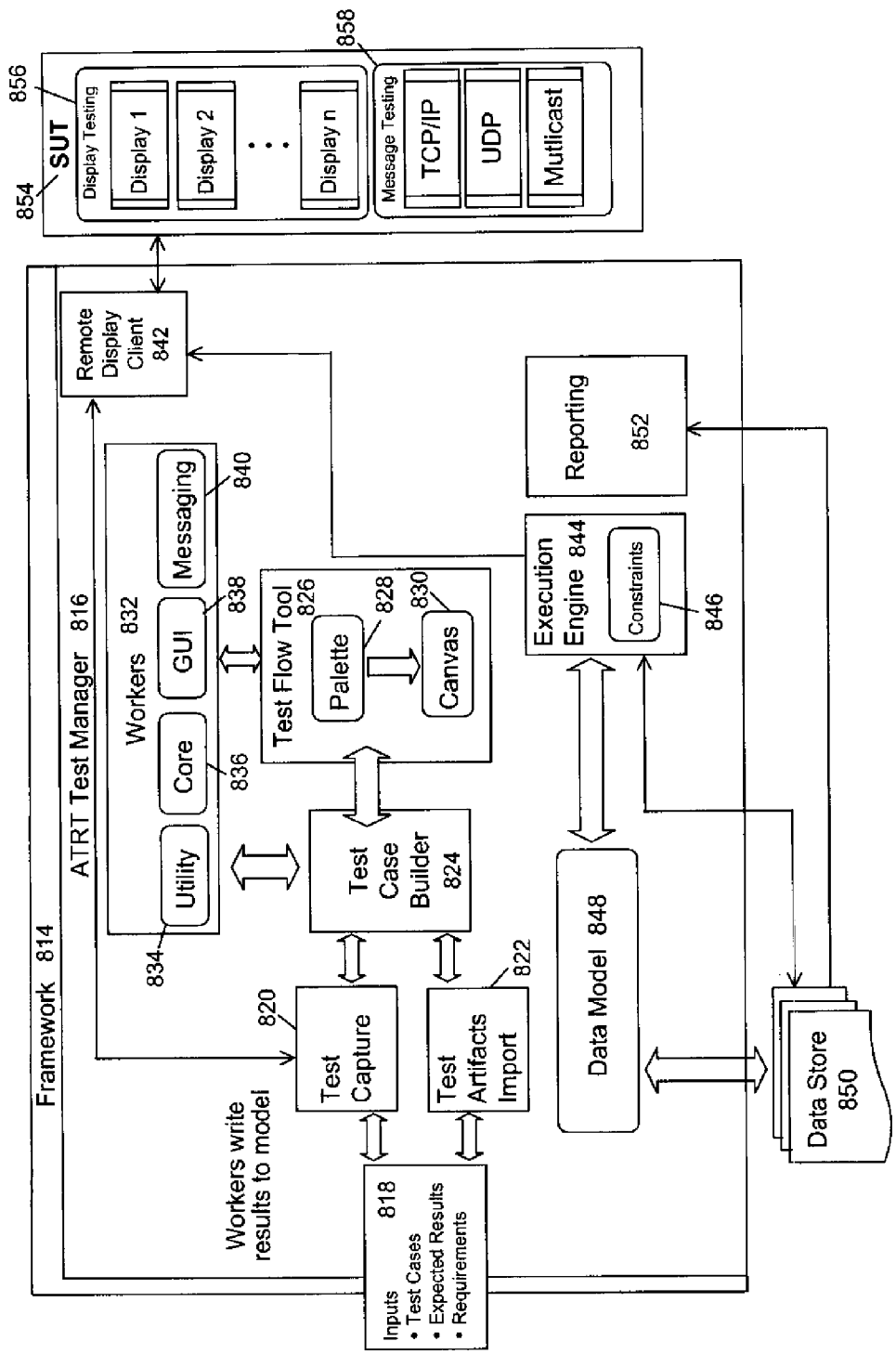
FIG. 8 is an exemplary diagram of a system software architecture for Test Manager, according to an embodiment of the present invention.

FIG. 8 is an exemplary diagram of a system software architecture for Test Manager, according to an embodiment of the present invention. Test Manager provides an automated software testing capability including a testing framework, automation engine and reporting features. It may be introduced at any phase of a program, utilize existing interfaces and documentation (e.g., requirements, test cases, interface documents, and software design documents), and applied to as much or as little of the testing program as desired. The automated testing capability provided with the Test Manager may provide a substantial reduction in the cost, time, and resources associated with traditional Test and Evaluation methods and processes for software intensive systems.

FIG. 8 illustrates how Test Manager 816 may interact with the System Under Test (SUT) 854. An embodiment of the present invention may use a framework, as shown by 814, with extensible functionality provided through plug-ins, as opposed to functionality that is hard coded. Users may extend UI aspects (e.g., layout, menus, toolbars, etc.) as well as functionality. Test Manager software architecture includes project specific and project independent components. These components may be built using an open development platform. Project independent components may include test case builder 824, reporting feature 852, and capture/playback engines. Project specific components may include test case setup, specific sender/receiver algorithm, and project specific plug-ins.

Test Manager 816 may include a common framework including reusable software services plug-ins. It may be built on a foundation that provides a modular development approach across a variety of platforms and languages. Test Manager architecture requirements include support for a variety of functionality, including applications running on multiple computers, applications developed in different languages, applications running on different operating systems, applications which use different types of network protocols such as TCP/IP, NDDS, UDP etc., integration of multiple commercial testing tools from different vendors and testing without having to install the Test Manager on the same computers as the Application Under Test (AUT).

An embodiment of the present invention may be cross-platform and cross-Operating System (OS) compatible. Many organizations are responsible for testing SUTs that run on various platforms across various Operating Systems. Instead of having to rely on purchasing different tools to be compatible with the different environments, Test Manager is cross-platform and cross OS compatible.

An embodiment of the present invention may also be GUI technology neutral and thus independent of any GUI controls (e.g., custom or non-custom). This addresses the issue with new GUI controls being developed constantly and testing tool vendors having a difficult time maintaining tool compatibility. Also, test data artifacts may be stored in XML format, which allows for industry standard cross-compatible data exchange and data representation.

Inputs, as shown by 818, may be received at Test Capture 820 and artifacts may be received at Test Artifacts Import 822. Inputs 818 may include test cases, expected results, requirements and/or other data. Test Case Builder 824 may then use the input information to generate test flows, using Test Flow Tool 826. Workers 832 may be in communication with Test Case Builder 824 and Test Flow Tool 826. Workers 832 may include functionality, such as Utility 834, Core 836, GUI 838 and Messaging 840. Remote Display client 842 may serve as an interface between SUT 854 and Test Capture 820. SUT provides Display Testing 856 and Messaging Testing 858. Multiple displays may be managed and tested by Display Testing 856. Multiple protocols may be supported by Messaging Testing 858. Execution Engine 844 may communicate with Remote Display client 842 and Data Model 848.

Test Manager 816 may interface with services on a SUT, as shown by 854. Such services may include those that may be performed more effectively through a non display-based testing approach. Data may be exchanged with an instance of Test Manager via a web service interface. Remote display technology allows Test Manager's installation to be non-intrusive to the System under Test (SUT), e.g., it does not modify the SUT configuration, which is often a prerequisite to testing of large commercial software systems. An embodiment of the present invention may connect to a different SUT component at the sub-step level. When a test sub-step requires a change in connection to a different SUT component, an IP address/connection feature allows a test sub-step to be modified and connected at the most granular level, e.g., the test sub-step level. Reporting functionality is available at 852, where reports and/or other data maybe stored in Data Store 850.

According to an embodiment of the present invention, Test Flow Modeling Tool 826 allows users to build models that represent a desired behavior of the test case during execution. Models built through the Test Flow Modeling Tool 826 may be referred to as Test Flows, and may be used by the execution engine to determine where and when to perform specific units of work. Test Flow Modeling Tool 826 may provide modeling capability by using its core components: canvas 830 and palette 828. Canvas 830 provides the workspace on which the user may construct models to represent execution flow. Palette 828 may contain collections of modeling components that serve as building blocks for the canvas. Components may be added from palette 828 to canvas 830 and arranged by the user to dictate the desired behavior of the test. Test Flow Modeling Tool 826 may use a modular and extensible approach, where various plug-ins may contribute additional components to the palette using APIs.

Execution Engine 844 may be responsible for the execution of a Test Flow as defined in the Test Flow model. The test execution may be heterogeneous in that it supports different types of functional units, called workers shown by 832, such as capture/playback testing or message testing 840. In addition to the test execution, Execution Engine 844 may provide an extension point to allow workers to provide specific execution environments that may be initiated and shutdown during the test execution. Execution Engine 844 may also provide extension points for executable constraints, as shown by 846, that may be added to a test execution. These constraints may be used to provide some level of test execution control at the user level. The constraints may also provide the ability to supply alternate paths of execution. A constraint, shown by 846, may be defined as a unit of work that abides by an Execution Engine interface specification for flow evaluation control. A constraint may be responsible for evaluating a path of execution to determine whether or not the path should be traversed.

An action may include a unit of work that may be added to a Test Flow model. A worker may be an implementation of a corresponding action that abides by an Execution Engine interface specification for job control. Execution Engine 844 may be responsible for managing execution of workers of specific types. The workers and the execution environments may be developed independently, or external to the Execution Engine 844, and pluggable into an Execution Engine framework.

Execution Engine 844 may execute parallel Test Flows through the use of fork, join and/or other actions. A parallel Test Flow may include an execution path that diverges within a single instance of the execution engine, and then converges either at a user created join action, or at the implicit join that occurs at the end of each distinct Test Flow. Execution engine 844 may also execute Test Flows concurrently. This may be accomplished when the user executes separate Test Flows in their own instance of Execution Engine 844. These instances may be completely independent of one another in the context of execution.

Workers 832 may be developed to carry out Test Manager automation. As new requirements may be identified, new workers may be developed and added to Framework 814. This allows for easy customization of Test Manager to meet various customer needs and preferences. According to an exemplary embodiment, workers available for test case modeling may include Core Workers 836, Utility Workers 834, GUI Workers 838 and Messaging Workers 840. Other functionality may be provided as well.

Core Workers 836 may perform actions available with any type of test case flow. Core actions may affect the flow of execution. Some examples include: Start Action which indicates the start of a Test Flow; Fork Action which may be used to fork multiple flow paths for parallel execution; Join Action which may join multiple Test Flow paths (e.g., if the test requires that multiple Test Flow paths finish before continuing, the user would use the join to make sure that the Test Flow paths complete before moving to next action); Wait Action which may be used to wait for a specified amount of time before further execution; and Manual Action which may prompt the user to perform an action before moving on (e.g., instructions for the manual action may be presented to the user).

Utility Workers 834 may perform data manipulation or other system functions. These actions may support and/or evaluate the results of other actions. For example, "Entered Data Comparison Action" may perform a comparison of a parameter to a value specified by the user. Comparison evaluation options may be dependent on the data type of the parameter. Exemplary comparisons may include: Numeric (e.g., equal to, not equal to, greater than, less than, greater than or equal to, less than or equal to, within inclusive range of); String (e.g., equal to, not equal to); and Boolean (e.g., true, false). "Parameter Comparison Action" may perform data comparisons of two or more parameters. Comparison evaluation options may be dependent on the data type of the parameter. Exemplary comparisons may include: Numeric (e.g., equal to not equal to, greater than, less than, greater than or equal to, less than or equal to); String (e.g., equal to, not equal to); and Boolean (e.g., equal to, not equal to, logical and, logical or). "Regular Expression Comparison" may compare a testable input string with a regular expression contained in another input string. Another example, may include "String Manipulation Action" which may provide the capability to perform string manipulations on a string parameter. Action produces the manipulation as an output parameter. Manipulation actions may include Transform—including regular expressions transformations; Sub String—creates a substring of this string using user defined start and end indices; To Lowercase—converts all of the characters in this string to lower case; To Uppercase—converts all of the characters in this string to upper case; Trim—omits leading and trailing whitespace from a string. "System Command Action" may allow users to specify commands which may be passed to the system during execution. Examples may include executing a shell script to perform some function. "Range Comparison Action" may include evaluating if a given input parameter lies within a user specified range. "Data Type Conversion Action" may provide the capability to convert an input parameter into any number of supported data types. For example, if a user sets the output parameter type to be equal to the type of the input, no conversion will take place. For the allowed conversions, an output may be a parameter of the new data type.

GUI Workers 838 may perform interactions with the display of a SUT. Some examples may include Mouse Click Coordinate Action which involves a mouse action at a specified (x, y) coordinate; Mouse Click Image Action which involves a mouse action on a specific image; Anchor Image Action may involve a mouse click on an image found in a specified area of the display or verify that an image appears in this specified area of the display; Move Mouse to Coordinate Action may allow users to specify an (x, y) coordinate on the screen to move the mouse cursor to Move Mouse to Image Action may allow users to specify an image on the screen to move the mouse cursor to; OCR Action may capture an image from the screen and use an Optical Character Recognition engine to convert it to a text string; Type Text Action may provide the user the capability to enter text that the user would enter in through the keyboard; Input Type Text Action may provide similar functionality to the type text action, but outputs a text string obtained from an incoming parameter edge rather than user entered text; Verify Image Action may provide the capability to verify that an image is found on the display; Wait for Image Action may provide the capability to wait for an image to appear on the display; and Mouse Wheel Action may capture middle mouse scroll wheel actions.

Within the GUI workers, shown by 838, an Image Target Viewer may be available for any action that uses an image. The user may view a snapshot of the screen at the time the image was captured into the action. The Image Target Viewer may allow the user to access a variety of information about the image associated with the particular action. As new types of image-based actions are added, the image target viewer framework may be extended to accommodate additional information to accurately represent the targets of those actions.

Messaging Workers 840 may communicate with the SUT via a Message Testing Module as shown by 858. Messages may include any message in any form from one device to another device via a network connection. Messages may include text, images, audio, video and/or other form of data, as well as various combination of the foregoing. Test Manager 130 may record Test Flows and playback back graphically at a later time. This may include capturing and analyzing send/receive messages that drive the SUT. For example, messages may be recorded and processed through Test Manager during the test to record and analyze the messages before a different subscriber system receives the messages. Messages may include sending and receiving scenario control messages; simulation control messages; heartbeat/health messages, for example.

Remote Display Client 842 may represent a collection of various plug-ins that work together to enable users to view and/or control a SUT, shown by 854, over a network. Remote Display client 853 may be designed so that access to a Remote Display connection may be managed through a connection handle. This allows multiple threads to share a connection. Each handle may be set to be read only separately. In addition, a handle owner may request that it be the only one with write access, for example. The handles may catch attempts to send key/mouse events before the connection is established or during a reconnect, and may wait a configurable amount of time with a configurable number of retires for the connection to establish before continuing. Remote Display client 842 may be designed to be independent of the overall System and may be used separately from the Test Manager.

A Record/Playback feature may allow the user to record a Remote Display session and subsequently play it back while performing test capture. The screenshots may be taken directly from the user activity on the SUT (e.g., user actions are not recorded via Test Manager client interface as they are during automated testing efforts, instead a user may directly interact with the SUT machine and screenshots may be recorded by the Test Manager client). The SUT recording may be stored for retrieval on the Test Manager client machine.

Reporting 852 may manage results and data pertaining to test case execution and may also display the results. Reporting 852 may present results of test case executions to the user in various levels of detail, from high-level summaries to action-by-action execution status reports. Reporting 852 also provides for execution-independent reports for various details of test cases. Formatting of reports may be based on custom templates, providing the reporting plug-in with the ability to display easily different formats in the future. In addition to generating and viewing reports within Test Manager, the Reporting plug-in provides support to export reports into other tools, including Microsoft Excel, HTML, Adobe PDF, and Microsoft Word.

Exemplary execution-specific reports may include: Actions Executed Report—provides an action-by-action detailed report of the execution run, including notes generated by the Execution Engine about action results; Post Execution Requirements—provides requirements traceability information by detailing the status of requirements that have been linked to an executed test case; Post Execution Summary—presents a summary of each test step's execution within the test case.

Execution-independent reports may include: Test Case Detailed Overview—displays a line-by-line report of all test steps and actions within a test case, along with any associated requirements and comments; Test Case Pre-Execution Requirements—summarizes all requirements linked to a test case and displays associated test steps; Test Case Summary Overview—provides an overview of each test step within a selected test case, listing expected results and requirements; Test Case Pre-Test—a combination of both Test Case Pre-Execution Requirements and Test Case Summary Overview reports.

Data Model 848 may provide the interfaces for storing and retrieving data used by Test Manager. One function may include abstracting details of how this data is persisted so that Test Manager may access data without being directly dependent on the specific persistence mechanisms or backing data stores. This abstraction may allow improvements or changes to persistence implementations without requiring modification to Test Manager. Data Model 848 may also enforce how the data may be organized, so that any semantics designed within the data model may be actively enforced. In addition to providing the support necessary to the core Test Manager application, Data Model 848 may also provide functionality to enable Test Flow workers to extend the model as desired.

Figure 9:
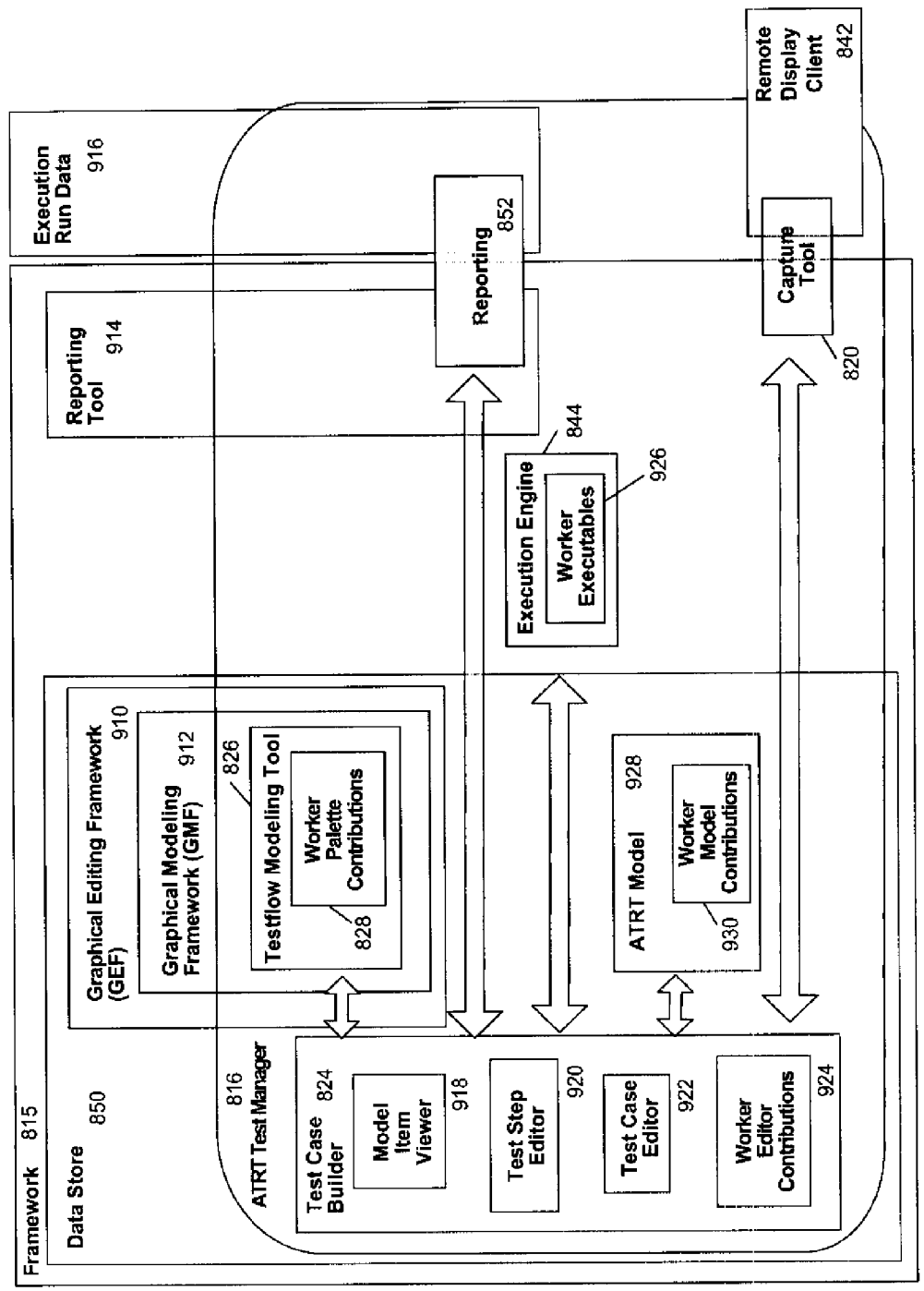
FIG. 9 is an exemplary Test Manager software design diagram, according to an embodiment of the present invention.

FIG. 9 is an exemplary Test Manager software design diagram, according to an embodiment of the present invention. FIG. 9 illustrates Test Manager and its functional areas. Test Manager allows the user to create, update, modify, and delete test data (e.g., test cases, test steps, etc.). Test Manager may provide an interface to connect to a SUT (System Under Test) and may further allows users to automate (e.g., capture and execute) display tests. Users may also monitor test case execution. Once execution is complete, users may view and print execution reports.

Test Manager may be built upon a framework and makes use of a component-based architecture to provide the application's functionality. Each functional area of the application may include one or more components and/or plug-ins. This architecture allows additional components to add or extend existing capabilities more easily within the application.

Data Store 850 may interact with Graphical Editing Framework 910 and Graphical Modeling Framework 912. Through Test Manager 816, Data Store 850 may interact with Reporting Tool 914, Execution Run Data 916 and Remote Display client 842. Reporting Tool integration allows for a flexible and extensible reporting framework. Users may design custom reports that may include an export capability to various reporting formats (e.g., pdf, Word, html, etc.). Within Test Manager 816, Test Case Builder 824 may interact with various other components, including Test Flow Modeling Tool 826, Reporting 852, Execution Engine 844, ATRT model 928 and Capture Tool 820. Test Case Builder 824 may include additional components, including Model Item Viewer 918, Test Step Editor 920, Test Case Editor 922 and Worker Editor Contributions 924. Test Flow Modeling Tool 826 may include Worker Palette Contributions 828. Reporting 852 may use Execution Run Data 916 and may use Reporting Tool 914 in generating various forms of reporting. Execution Engine 844 may include Worker Executables 926. ATRT Model 928 may include Worker Model Contributions 930. Capture Tool 820 may capture data from Remote Display client 842.

Figure 10:
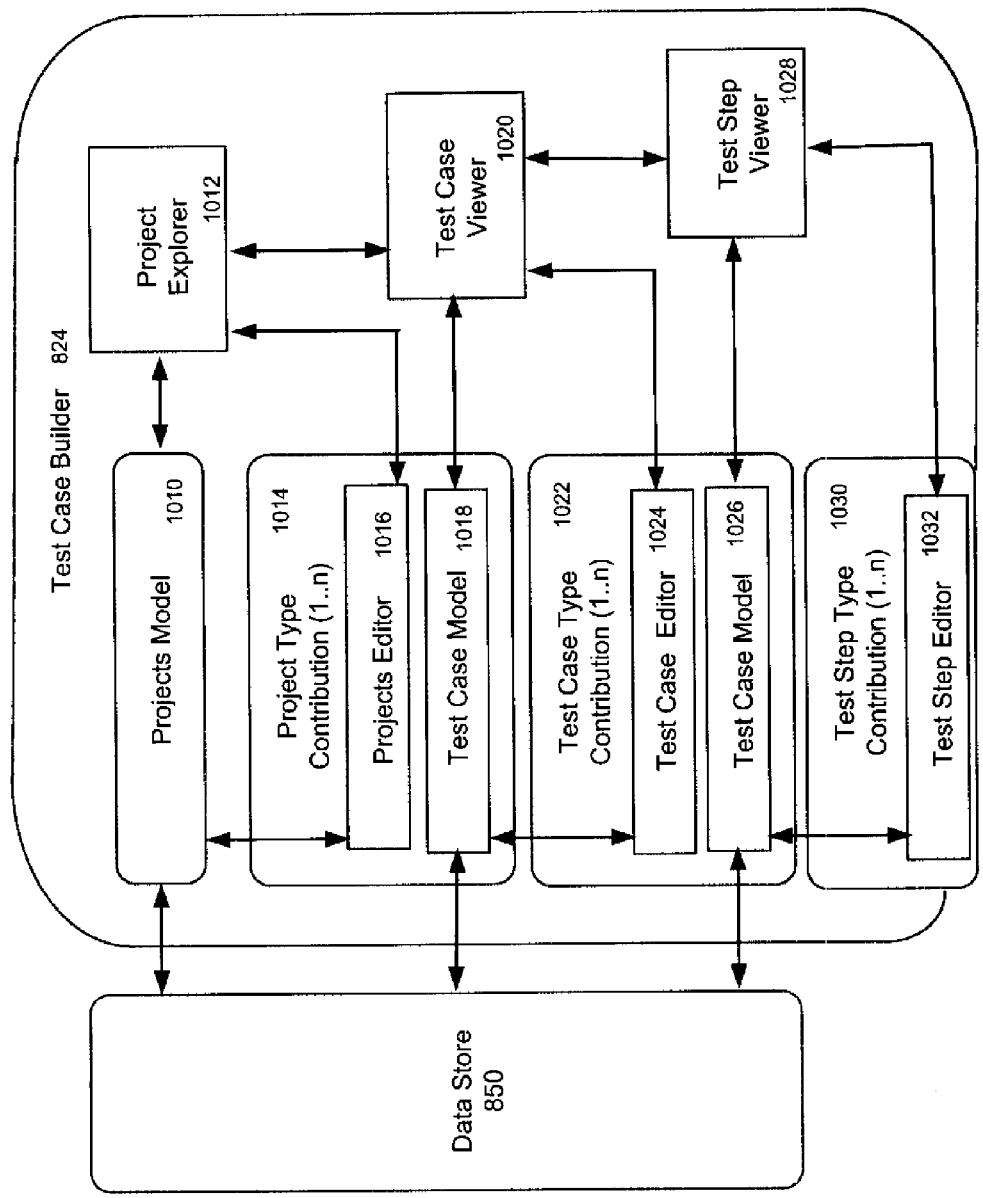
FIG. 10 is an exemplary illustration of a Test Case Builder, according to an embodiment of the present invention.

FIG. 10 is an exemplary illustration of a Test Case Builder, according to an embodiment of the present invention. Test Case Builder 824 may provide common functionality for creating and editing test cases and their respective test steps. Test Case Builder 824 may provide a mechanism for new test step types to be contributed independently, allowing for future expansion of the types of test cases that can be designed. For example, Test Case Builder 824 may supports Message and GUI based test steps. As shown in FIG. 10, Test Case Builder 824 may include Projects module 1010, Project Explorer 1012, Test Case Viewer 1020, Test Step Viewer 1028. Depending on the complexity of the software being tested, various project type contributions 1014, test case type contributions 1022 and test step type contributions 1030 may be implemented. Project Type Contribution 1014 may include Project Editor 1016 and Test Case Module 1018. Test Case Type Contribution 1022 may include Test Case Editor 1024 and Test Step Model 1026. Test Step Type Contribution 1030 may include Test Step Editor 1032.

Figure 11:
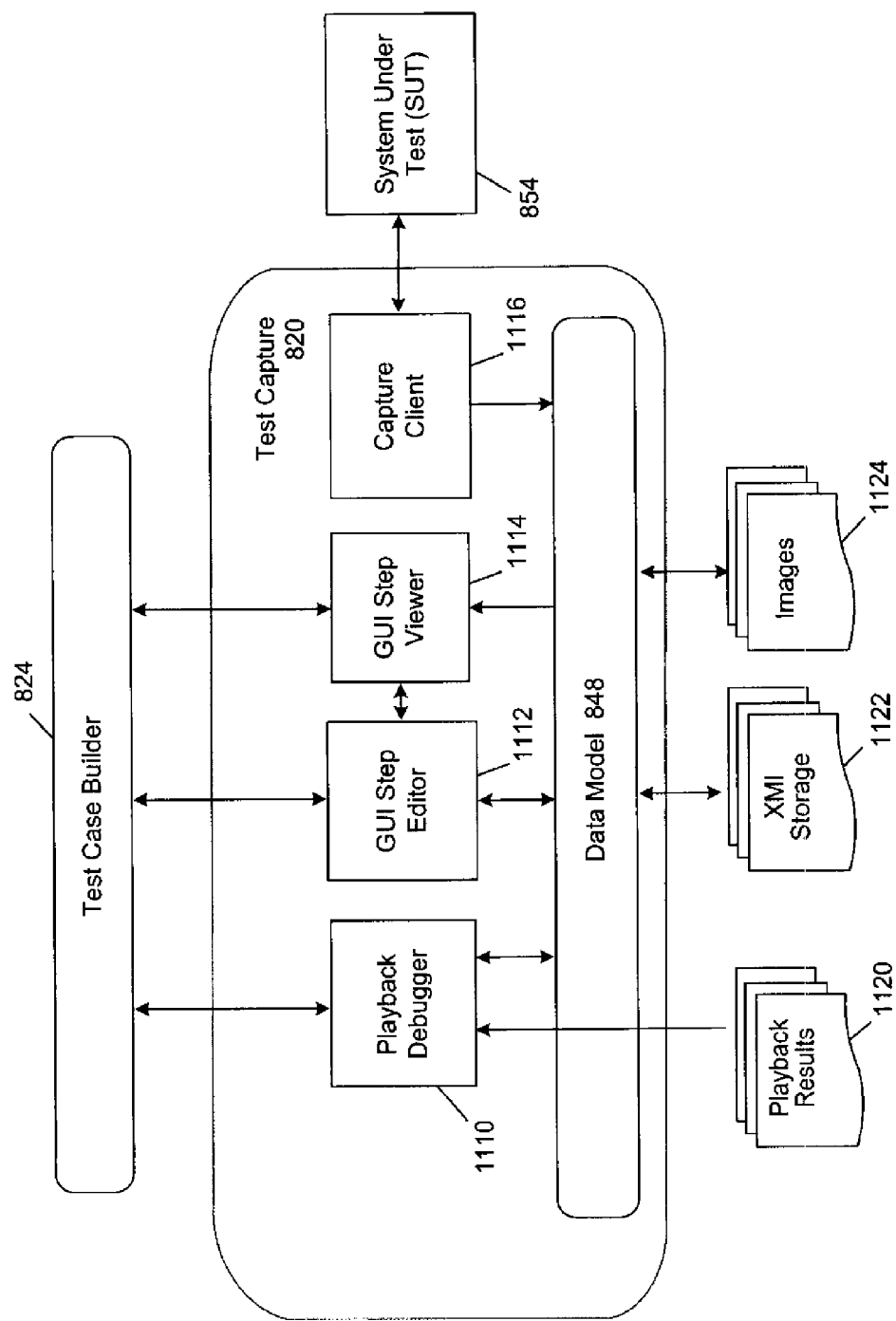
FIG. 11 is an exemplary illustration of a Test Capture Tool, according to an embodiment of the present invention.

FIG. 11 is an exemplary illustration of a Test Capture Tool, according to an embodiment of the present invention. Test Capture Tool may allow the user to create GUI test cases and test steps by associating mouse actions with images and/or (x, y) coordinates captured from the System Under Test (SUT) and to store these actions within a test step. As shown in FIG. 11, Test Capture 820 may include Playback Debugger 1110, GUI Step Editor 1112, GUI Step Viewer 1114 and Capture Client 1116. Capture Client 1116 may interact with SUT 854 and with GUI Data Model 848, which may in turn communicate with the various blocks of Test Capture 820 as well as XMI Storage 1122 and Images 1124. Playback Debugger 1110 may interact with Playback Results 1120. Test Case Builder 824 may interact with the various blocks of Test Capture 820.

Figure 12:
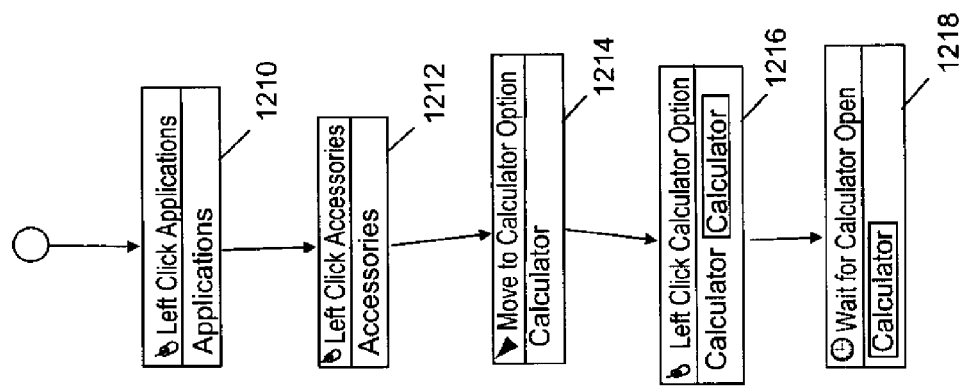
FIG. 12 is an exemplary simple linear flow, according to an embodiment of the present invention.
Figure 13:
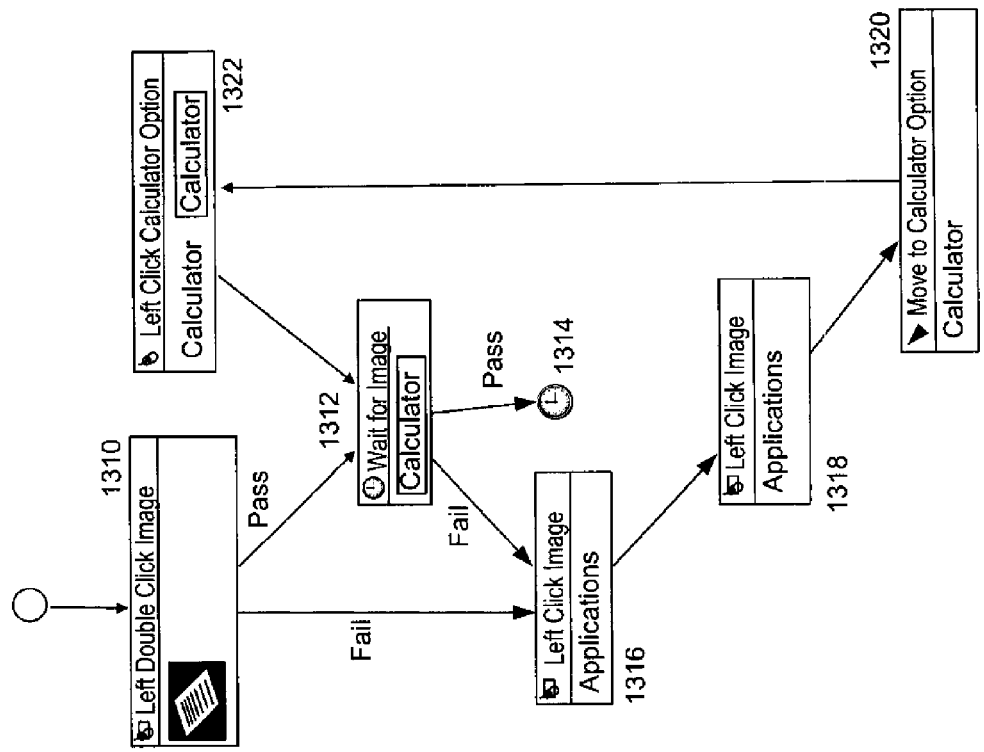
FIG. 13 is an exemplary complex flow, according to an embodiment of the present invention.

FIG. 12 is an exemplary simple linear flow, according to an embodiment of the present invention. The linear flow starts at step 1210 and proceeds to 1218 in a linear manner. FIG. 13 is an exemplary complex flow, according to an embodiment of the present invention. The complex flow illustrated starts at 1310 and proceeds through a series of pass/fail inquiries in a continuous loop. According to an embodiment of the present invention, a "test flow" may be defined as a series of time ordered steps by which a user (or groups of users) may control the system under test to exercise a specified Scenario.

According to an exemplary embodiment, there may be two types of use cases which model the expected behaviors of a SUT; Main Use Cases and Functional Use Cases. A Main use case may verify combat system set-up parameters such as doctrine, policy, area, search doctrine, etc. Functional Use Cases may be dependent on Main Use Cases and only get exercised if their dependant Main Use Case qualifies. "Functional use cases" may be described by System Modeling Language, these Use Cases may describe functional behavior (e.g., Search, Track, etc.) of the system under test as well as how the system requirements may be related to that behavior. Groups of functional Use Cases may describe a full Scenario. Examples of Functional Use Cases may include search, track, characterization, discrimination, and kill evaluation. A "scenario" may be a tactical situation presented to the System Under Test (SUT) in order to test specific behavioral paths through the system. This may be thought of as a type of engagement, specific search doctrine tasking, etc. A "test procedure" may be the full description of a system test which includes the Test Flow, the exercised Scenario, and Requirements. "Relationships" may be a relation between groups of requirements and Test Procedures. From this environment, the Test Flow may be automatically mapped directly to a series of analysis threads. Simply put, when the system user sets up a Test Flow, the Use Cases and mapped requirements may be automatically determined from their dependencies within the System Model.

The integration and optimization of the Test Manager, which automates test conduction, with the Analysis Manager, which automates the analysis, may involve forming an integrated Test Flow in a System Model. By providing the linkage between a Test Flow and a Scenario, a user may derive fundamental test metrics such as number of requirements covered by a given Test Procedure, number of Test Procedures needed to fully test a requirement, etc. This allows for an embodiment of the present invention to link and fully characterize the Test Flows, Scenarios, and Relationships in the model.

A user may display or export any Relationship which is described by the System Model from an easy-to-use GUI. The GUI may then allow derivation of real-time, short term, or long term test plans for better requirements coverage. For example, as soon as a Test Procedure is completed, an embodiment of the present invention may provide results to allow for real-time adaptive test planning. Also, the Analysis Manager may be aware of the parameters of the exact test conducted. This may include ground truth (injected target), doctrine parameters, build information, timelines, etc. This information may allow for Analysis Manager to be automated with the user not needing to supply any input information. In addition, an embodiment of the present invention may track requirements based metrics over time (or System Builds, Baselines, etc.) since it is aware what Test Procedures were exercised and how the Scenarios performed from a requirements Pass/Fail/No-Test perspective. An embodiment of the present invention may form time dependent reports tracking performance of anything from individual requirements to full Scenarios or Test Procedures.

Test Manager may utilize Test Flows which describe a sequence of actions to perform on a System Under Test (SUT). When Test Flows are exercised, specific Use Cases may be analyzed using the extracted data. This linkage between Test Flows and Use Cases may be stored in the system model. An embodiment of the present invention is directed to injecting Test Flows from Test Manager into an operating system and inject the modeled Test Flows into Test Manager. This linkage allows for the System Model to become a central repository for the system design, requirements, analysis Use Cases and Test Flows. It is this linkage that may be utilized to form test planning and real time test execution metrics to gain efficiencies across throughout the testing spectrum.

According to an exemplary application, Test Flows in the Test Manager may be broken out by Actions, Functions and Test Steps. Actions may be specific tasks that the Test Manager performs on the SUT, which may include a right mouse click on a specified image, drag and drop, or the verification of a track number output to the screen are all basis Actions. Functions may include groups of Actions and may be typically pieces of functionality that may be commonly repeated throughout test. Function examples include injecting a target, hooking a track, initializing a subsystem, etc., which may involve many specific Test Manager basis Actions. Test Steps may roll up groups of Functions; bringing up the system from a cold start would be a Test Step which involves initializing many subsystems. Depending on the complexity of a Test Flow, some or all of these groups of Actions may be used.

Figure 14:
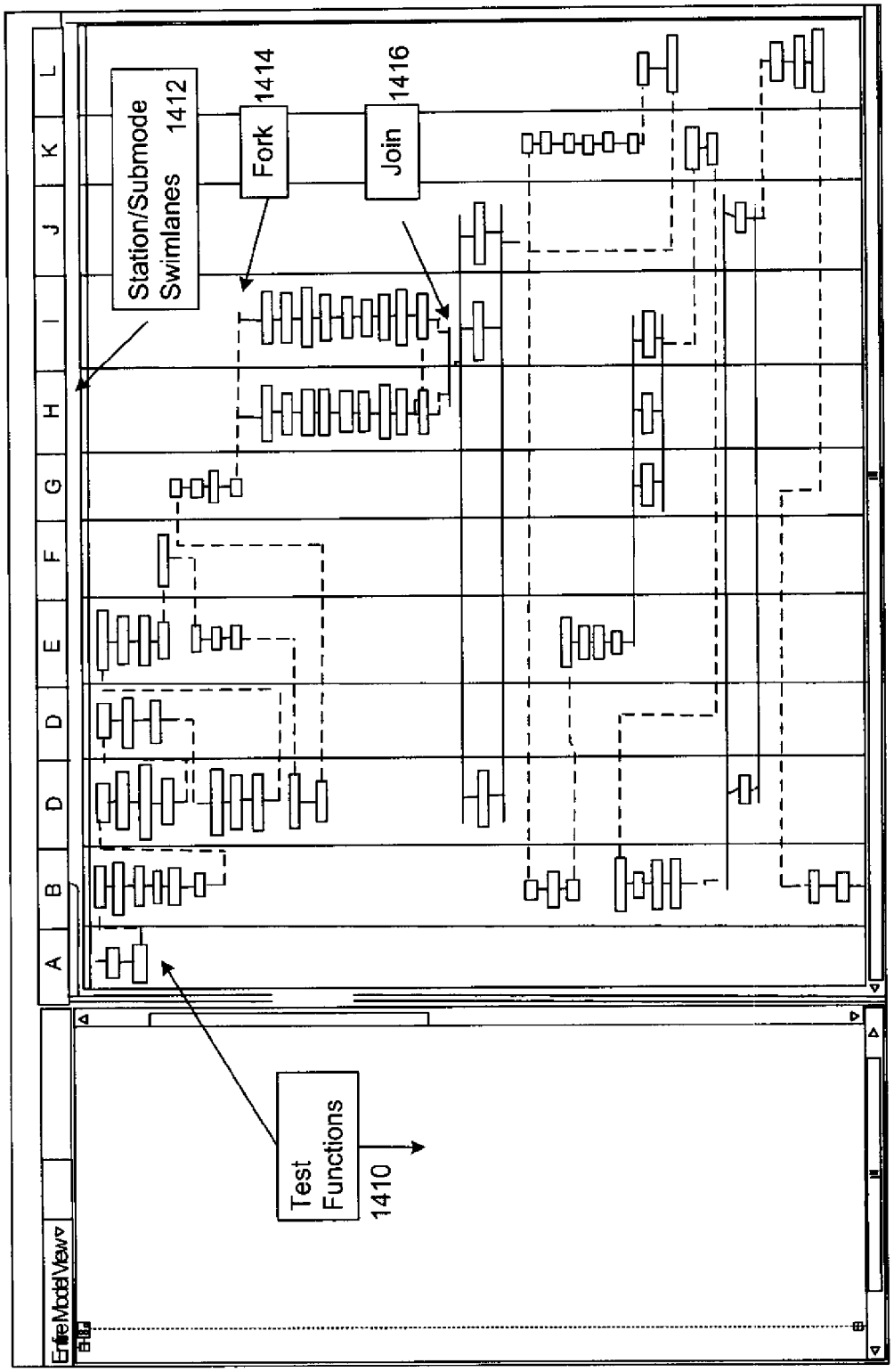
FIG. 14 is an exemplary test flow, according to an embodiment of the present invention.

FIG. 14 is an exemplary test flow, according to an embodiment of the present invention. Test Functions 1410 may represent the details of each test step in the procedure. In this example, eighty-four Test Functions were created for this procedure. Swimlanes may include a visual element that may be used to distinguish responsibilities of a process. In this exemplary architecture, swimlanes 1412 reflect various stations and submodes for conducting system testing. Actions (or call behaviors to actions) which may include fundamental use case units or steps. Swimlanes which may defines which structural component an action belongs. Blocks which may include message type between structural components (across Swim Lanes). Attributes which may include Control Flows, Object Flows, Initial Flow, Forks, Joins, Activity Final. In FIG. 14, the concept of forks and joins are illustrated. Forks 1414 and Joins 1416 are control nodes that coordinate the flow of the process. In this exemplary application, a Fork 1414 may be used to represent parallel test threads that may be tested concurrently. A Join 1416 may synchronize parallel threads back to one test thread.

Activity Diagrams illustrate how the behavioral threads may be built from a series of system activities. Activity diagrams illustrate behavior associated with a Use Case utilizing input/output (messages) and control flows. In this diagram, the swimlanes have been designed to reflect different system components. The action boxes may represent the system behavior and the object node boxes may represent internal messages.

Requirements may be linked to actions; this linking mechanism enables assessments to be made. Requirement Diagrams may represent requirements and how they are satisfied; these diagrams may have a corresponding Activity Diagram and may describe requirements dependency on Use Case behaviors. Requirements Diagrams may include: Requirements which include a capability or condition that must be satisfied; Dependencies which may include a relationship that signifies model elements require other model elements for their implementation; and Actions which may correspond to an Activity Diagram.

An embodiment of the present invention may support multiple methods of creating Test Flows to synchronize with analysis Use Cases in a system model. This may be done by allowing a user to develop Test Flows in Test Manager (e.g., through GUI capture) or by generating Test Flows in the System Model and inject them into Test Manager as executable tests.

Figure 15:
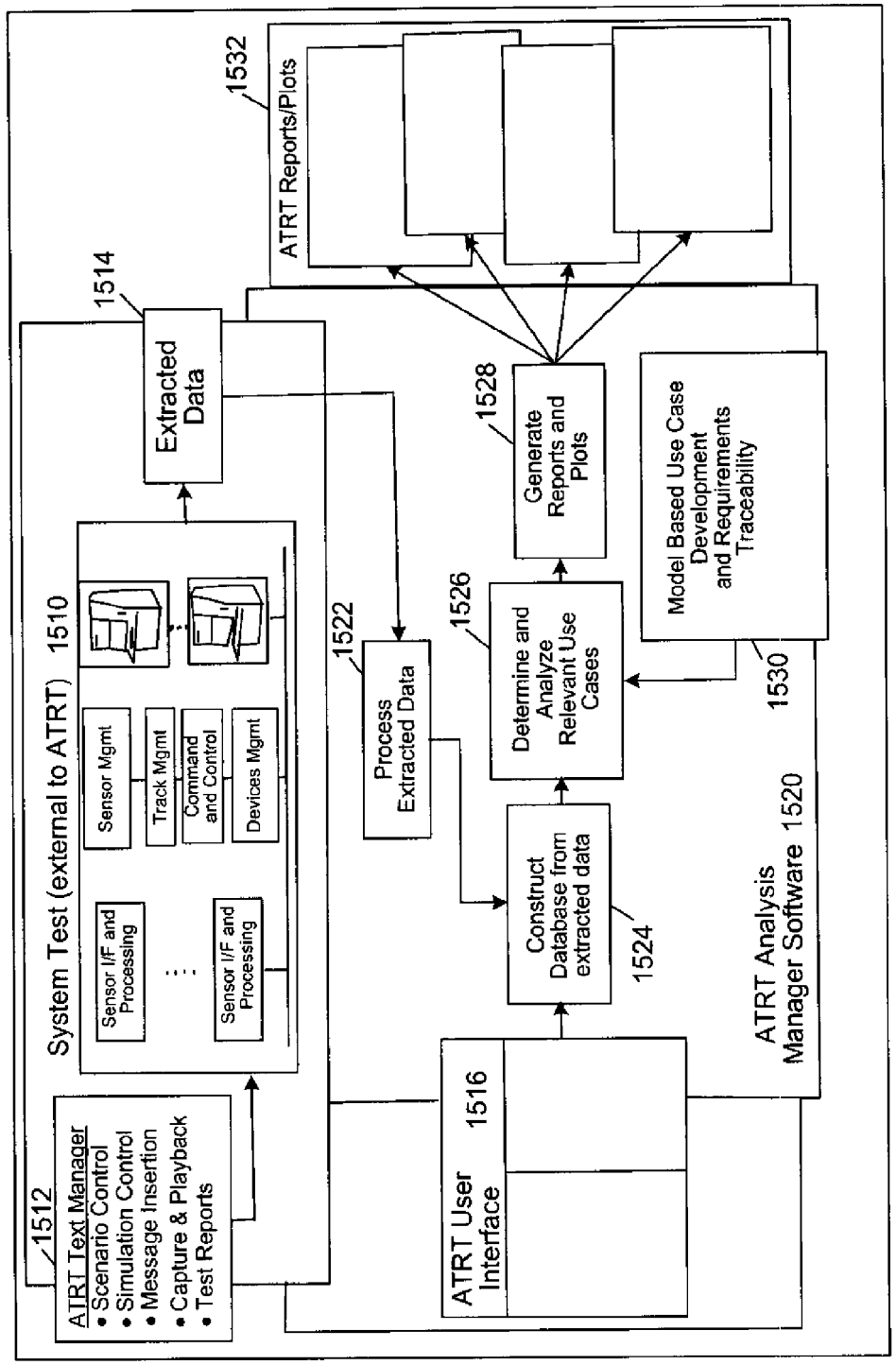
FIG. 15 is an exemplary process diagram for Analysis Manager, according to an embodiment of the present invention.

FIG. 15 is an exemplary process diagram for Analysis Manager, according to an embodiment of the present invention. Test Manager 1512 may provide various functions, including scenario control, simulation control, message insertion, capture and playback and test reports. Analysis Manager may extract data, shown by 1514, from System Test 1510. Extracted Data may then be processed by Analysis Manager at 1522. Analysis Manager Software 1520 may communicate to a user, via a User Interface 1516. Analysis Manager may then construct a database from extracted data at 1524. Relevant use cases may be determined and analyzed at 1526. Model based used case development and requirements traceability may be provided by 1530. Reports, plots and/or other output may be generated at 1528 and further displayed at 1532. Analysis may include data management, event reconstruction, requirements verification, performance analysis and various types of test reports.

Figure 16:
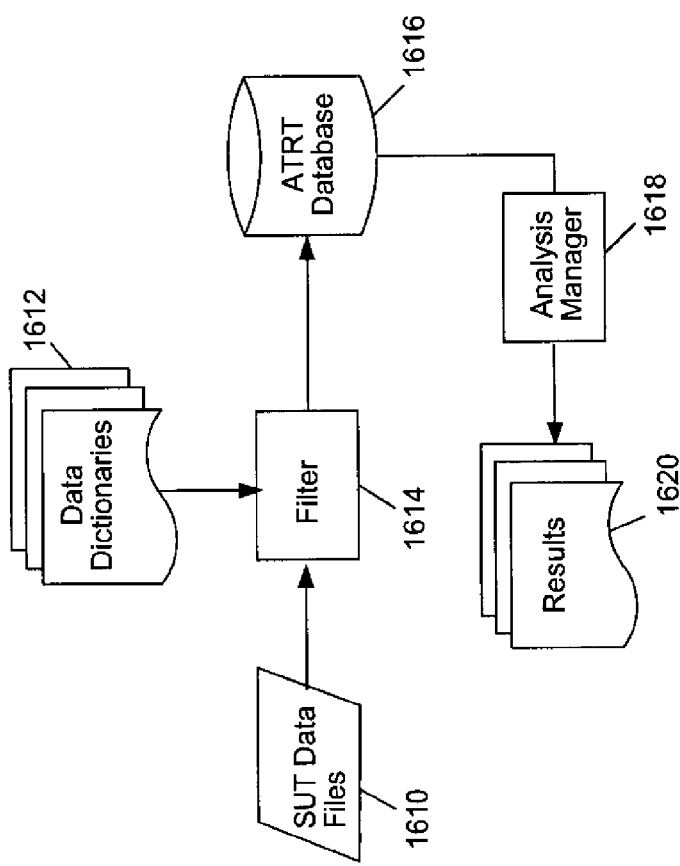
FIG. 16 is an exemplary Analysis Manger data flowchart, according to an embodiment of the present invention.

FIG. 16 is an exemplary Analysis Manger data flowchart, according to an embodiment of the present invention. Analysis Manager may assist users to pinpoint failures and/or other issues or concerns in the SUT. The exemplary flowchart depicts SUT data files 1610 that are received by Filter 1614. An exemplary format of the system data files may include raw compressed data recording format or other form of raw system data. Data dictionaries 1612 provide information on how to read and/or otherwise process the received raw data. Filter 1614 may filter the system data files using the information and/or instructions provided by Data Dictionaries 1612. Also, filter 1614 may transform the data to a predetermined format. After filtering and/or processing, the data may be stored in ATRT Database 1616. Analysis Manager 1618 may then use the data to perform its analysis and generate results, which may be displayed at 1620. Analysis Manager 1618 may provide automated analysis reports in a variety of formats that help the analyst quickly navigate large amounts of data to arrive at the specific data of interest for detailed root cause analysis.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented system for automated test and retesting using an interactive interface provided by a computer processor, the system comprising:
   a test case builder, comprising at least one processor, configured to automatically generate code for a test case;
   a test flow tool, comprising at least one processor, configured to generate a plurality of test flows for the test case once system modeling and metadata are completed for the test case wherein the test flow tool provides modeling capability through an interface comprising a canvas configured to build test flows and a palette that contains a collection of modeling components that are arranged by a user;
   an execution engine, comprising at least one processor, configured to automatically execute the plurality of test flows on a system under test; and
   an output interface configured to receive output data from the system under test.

2. The system of claim 1, further comprising:
   a capture input configured to record at least one of the plurality of test flows; and
   a playback output configured to graphically playback the recorded at least one test flow.

3. The system of claim 1, further comprising:
   a messaging module configured to send and receive one or more messages to drive the system under test.

4. The system of claim 3, wherein the one or more messages comprise one or more of: scenario control messages, simulation control messages and heartbeat messages.

5. The system of claim 1, further comprising:
   an input interface, comprising at least one processor, configured to receive one or more system requirements and one or more model artifacts; wherein the test case builder further automatically generates code for the test case based on one or more system requirements and one or more model artifacts.

6. The system of claim 5, further comprising:
   an analysis manager, comprising at least one processor, configured to receive the output data from the system under test and generate one or more outputs based on the output data.

7. The system of claim 6, wherein the one or more outputs comprise one or more of analysis reports and analysis plots.

8. The system of claim 5, wherein the one or more system requirements comprise one or more of: test procedures and descriptive testing metadata.

9. The system of claim 5, wherein the one or more model artifacts comprise one or more of: use cases, activity diagrams, sequence diagrams and behaviors of the system under test.

10. The system of claim 1, wherein the at least one test flow is graphically created or modified by a user, without using scripts.

11. A computer implemented method for automated test and retesting using an interactive interface provided by a computer processor, the method comprising the steps of:
   automatically generating, via a test case builder comprising at least one processor, code for a test case;
   generating, via a test flow tool comprising at least one processor, a plurality of test flows for the test case once system modeling and metadata are completed for the test case wherein the test flow tool provides modeling capability through an interface comprising a canvas configured to build test flows and a palette that contains a collection of modeling components that are arranged by a user; and
   automatically executing, via an execution engine comprising at least one processor, the plurality of test flows on a system under test; and
   receiving, via an output interface, output data from the system under test.

12. The method of claim 11, further comprising:
   recording, via a capture input, the at least one of the plurality of test flow; and
   graphically playing, via a playback output, the recorded at least one test flow.

13. The method of claim 11, further comprising:
sending, via a messaging module, one or more first messages to drive the system under test and;
receiving, via a messaging module, one or more second messages.

14. The method of claim 13, wherein the one or more messages comprise one or more of: scenario control messages, simulation control messages and heartbeat messages.

15. The method of claim 11, further comprising:
receiving, via an input interface comprising at least one processor, one or more system requirements and one or more model artifacts; wherein the test case builder further automatically generates code for the test case based on one or more system requirements and one or more model artifacts.

16. The method of claim 15, further comprising:
receiving, via an analysis manager comprising at least one processor, the output data from the system under test and generate one or more outputs based on the output data.

17. The method of claim 16, wherein the one or more outputs comprise one or more of analysis reports and analysis plots.

18. The method of claim 15, wherein the one or more system requirements comprise one or more of: test procedures and descriptive testing metadata.

19. The method of claim 15, wherein the one or more model artifacts comprise one or more of: use cases, activity diagrams, sequence diagrams and behaviors of the system under test.

20. The method of claim 11, wherein the at least one test flow is graphically created or modified by a user, without using scripts.

\* \* \* \* \*